Figure 1:
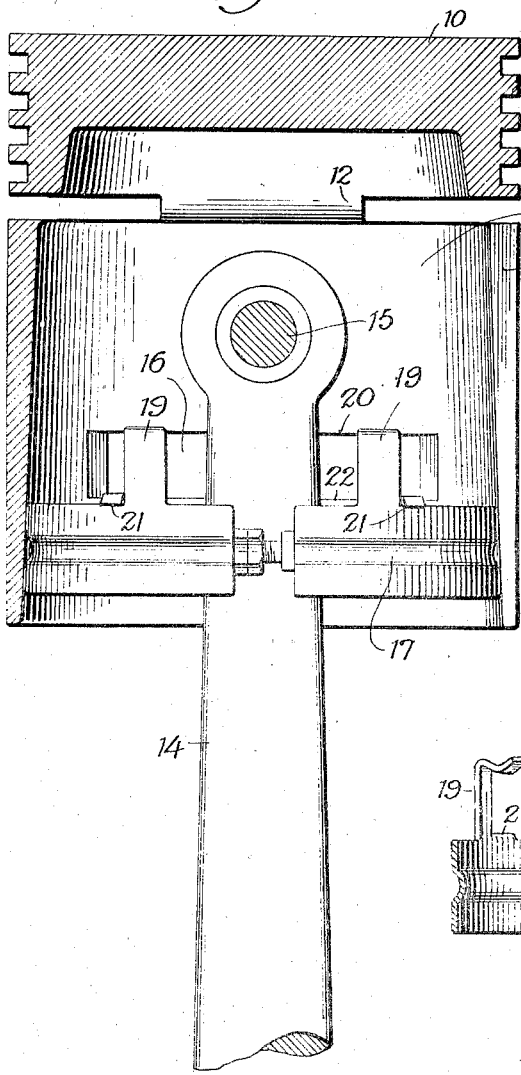

Feb. 11, 1930.  B. L. BLOUGH  1,746,515

PISTON EXPANDER

Filed July 2, 1928

INVENTOR.
Bert L. Blough,
BY
John N. Farley
ATTORNEY.

Patented Feb. 11, 1930

1,746,515

UNITED STATES PATENT OFFICE

BERT L. BLOUGH, OF MEMPHIS, TENNESSEE, ASSIGNOR OF ONE-HALF TO ABE GOODMAN, JR., OF MEMPHIS, TENNESSEE

PISTON EXPANDER

Application filed July 2, 1928. Serial No. 289,948.

My invention relates to a piston expander and it is an object of the same to provide a device of this character which shall be easily applied to a piston without removing the same from the engine of an automobile or the like.

Other objects are to provide a device of this character which shall be securely held in place without the necessity of modifying the piston in any respect, which shall be very light so as not to increase the weight of the piston unduly and which is adjustable to compensate for wear and which is capable of a considerable amount of contraction and expansion, to follow the contraction and expansion of the piston.

My device is intended particularly for use with light weight pistons, such as are now commonly employed in automobiles of various types and are commonly made from alloys of aluminum, such as alunite. Such pistons are light in weight and give quicker pick-up to the car, but they are less durable than the cast-iron pistons heretofore commonly in use, and wear of the periphery of the piston makes the engine noisy. It is therefore desirable to use an expander which can be made to hold the split skirt commonly found in light weight pistons, in expanded relation so as to fit reasonably closely in the cylinder.

Figure 2:
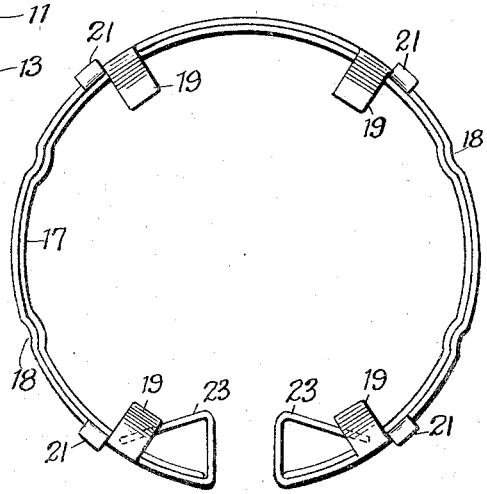
Figure 3:
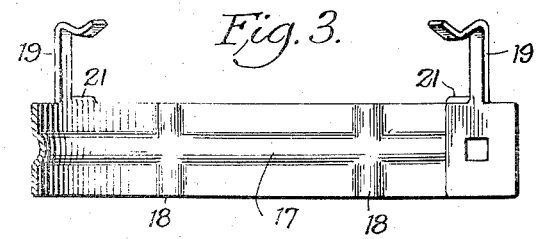
Figure 4:
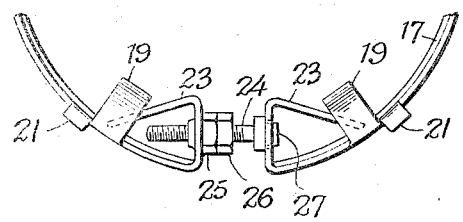

Referring to the drawings, which are made a part of this application and in which similar reference characters indicate similar parts:

Fig. 1 is a vertical section of a conventional piston, showing my device applied thereto, Fig. 2, a plan of my device, Fig. 3, a vertical section thereof, and Fig. 4, a detail showing the adjusting means.

In the drawings reference character 10 indicates the head of the piston which is commonly connected to the skirt 11 by some such means as the narrow necks of metal indicated at 12, the piston being ordinarily split at one side as indicated at 13, or otherwise slitted lengthwise or diagonally. A connecting rod 14 is attached to the piston by a pin 15 and openings are provided at the sides as indicated at 16.

The expander of my invention consists of an annular member provided with one or more circumferential corrugations 17 and with vertical corrugations 18. The circumferential corrugations may extend only up to the vertical corrugations or they may extend all the way around the ring as desired. The circumferential corrugations are intended to strengthen the ring circumferentially so that it may be made of light material, while the vertical corrugations provide elements of resiliency whereby the ring may be forced into close engagement with the piston, the vertical ridges yielding slightly and thus insuring that the ring will follow the expansion of the piston as the piston becomes heated.

Upwardly extending fingers 19 on the ring are bent inwardly to engage with the edge of the conventional flattened portion of the piston wall in which flattened portion the piston bosses are formed for receiving the piston pin, such edge being indicated at 20 in Fig. 1. This holds the expander against upward movement relative to the cylinder. To hold the piston against downward movement projections are formed at 21 which extend outward over a rim at 22 on the lower annular part of the skirt, or which may be bent outward over said rim after the expander has been located in position if the material of the expander is such as to permit easy bending.

For expanding the ring I have bent the ends of the same backward as indicated at 23 and have formed openings in the bent-back portions to receive a bolt 24 carrying a nut 25 and a lock nut 26. The head of the bolt is secured as indicated at 27, to engage a square opening in the back-bent portion of the ring. It will be seen that this prevents rotation of the bolt and facilitates adjustment of the nut and lock nut particularly where they are placed on the piston while it is in position in the engine. It will be seen that the split in the ring permits this to be done readily, the bolt 24 being removed while the ring is being positioned, after which the bolt can readily be put in place and adjustment of the nut 25 will then give a positive adjustment to the ring, expanding the same against the skirt to hold it securely in place. The ring may be adjusted to compensate for wear on the periphery of the piston, as will be obvious. When thus positioned the expanders will not rattle nor will they interfere with the adjustment of the bolt. Preferably the expanders will be made of spring steel for lightness and strength.

It will be obvious to those skilled in the art that various modifications may be made in my device without departing from the spirit of the invention and therefore I do not limit myself to what is shown in the drawings and described in the specification but only as indicated in the appended claims.

Having thus fully described my said invention, what I claim as new and desire to secure by Letters Patent, is:

1. An expander for pistons having opposed lateral openings comprising a ring adapted to bear against the inner periphery of a piston, expanding means for said ring, and means on the ring for engaging the piston at the top and bottom of said openings.

2. A piston expander comprising a circumferentially corrugated ring of thin sheet metal, expanding means for said ring for causing it to engage and expand a piston, and means carried by the ring for upholding it in position against endwise displacement relative to said piston.

3. A piston expander comprising a vertically corrugated ring of thin sheet metal, expanding means for said ring for causing it to engage and expand a piston, and means carried by the ring for holding it in position against endwise displacement relative to said piston.

4. A piston expander comprising a split ring having its extremities bent inwardly to provide portions for engagement by a bolt one of said inwardly bent extremities being provided with a bolt receiving opening and the other extremity being provided with an opening of non-circular configuration for receiving the non-circular head of a bolt, and a bolt disposed in one of said openings and having its non-circular head disposed in the other of said openings and provided with a nut for expanding the ring.

In testimony whereof I affix my signature.

BERT L. BLOUGH.